May 31, 1955  A. KREIDLER  2,709,464

MOUNTING ARRANGEMENT FOR ROTATABLE CIRCULAR SAW BLADES

Filed Aug. 10, 1951

INVENTOR
Alfred Kreidler

United States Patent Office 2,709,464
Patented May 31, 1955

2,709,464

MOUNTING ARRANGEMENT FOR ROTATABLE CIRCULAR SAW BLADES

Alfred Kreidler, Stuttgart, Germany

Application August 10, 1951, Serial No. 241,375

Claims priority, application Germany August 16, 1950

7 Claims. (Cl. 143—160)

This invention concerns circular saws and in particular the mounting arrangements provided on such sawing machines for supporting the actual circular saw blade.

When sawing bodies of large dimensions, for example metal bars of considerable diameter, difficulties have arisen. If a thin saw blade is used, deflection of the cutting edge is excessive. Vibration of the blade occurs resulting in an inclined cut and an undesirably marked surface. On the other hand, if a saw blade of considerable thickness is employed, a great deal of waste occurs particularly if thick bars of material are to be cut up into a large number of short pieces. For example on cutting up a bar of 100 mm. diameter into a plurality of 10 mm. thick slices, the waste amounts to 40% if a saw blade of 4 mm. thickness is used.

The object of the present invention is to make it possible to use relatively thin saw blades even for very large work pieces.

Attempts have been made to solve this problem by providing guides for the blade, supporting the blade at both sides without pressure. Vibration was eliminated in the immediate region of the guides, but in other parts of the blade, particularly at the point of application to the material to be cut, vibration was not eliminated when high stresses occurred nor was the blade prevented from being deflected.

According to the present invention, a mounting arrangement for a circular saw blade includes resilient means between which the blade is guided or supported at least in the immediate vicinity of the point of application to the material to be cut, preferably both before and after said point of application, with sufficient force to prevent deflection of the blade in its unsupported region at said point of application. Preferably the resilient means comprises two members, one of which is rigidly connected to the machine frame, whilst the other is urged theretowards by an adjustable spring, the saw blade being disposed between said members. It is desirable that the shaft should have a certain degree of longitudinal play in order to prevent the blade seizing between the members due to manufacturing inaccuracies and the saw bearings are so mounted on the drive shaft to allow of this and the gripping means may conveniently enclose the whole of the saw blade periphery except in the region of its point of application so that it acts as a protective device.

Figure 1:
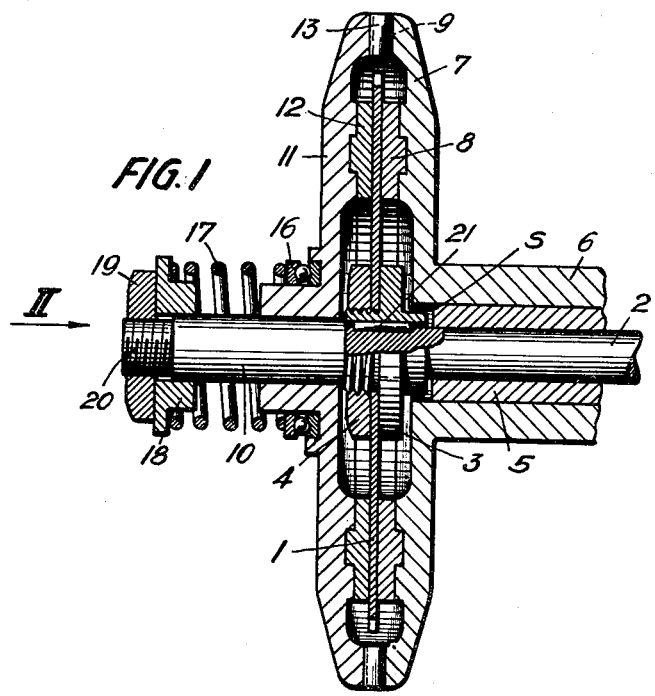
Figure 2:
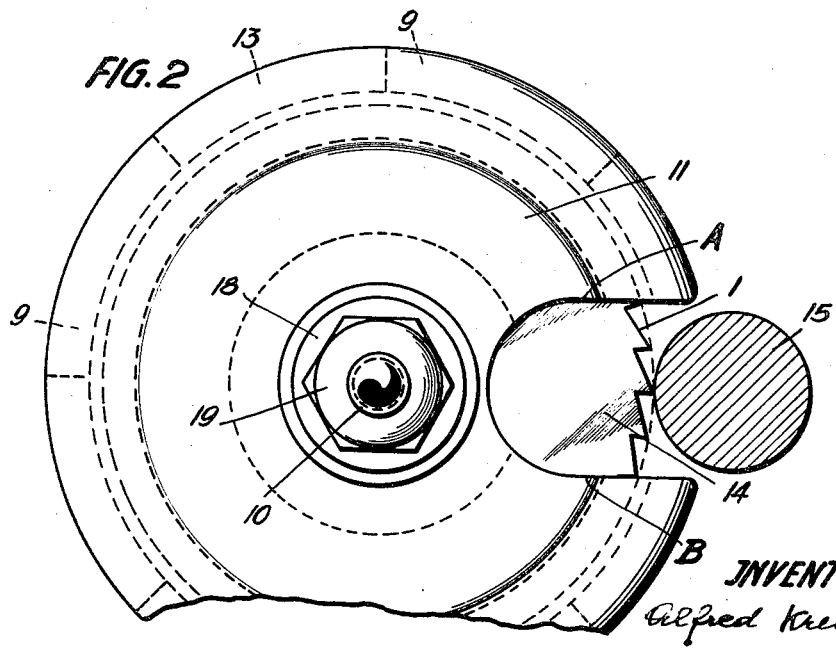

The invention will be described further by way of example with reference to the accompanying drawings in which:

Fig. 1 is longitudinal sectional view of the mounting arrangement for a circular saw blade constructed according to the invention, and Fig. 2 is an end elevation in the direction of the arrow 2 of Fig. 1.

The saw blade 1 is retained on its driving shaft 2 in the direction of rotation between collar 3 and nut 4 which are displaceable in an axial direction on a flat key let partly into collar 3 and shaft 2. The shaft 2 is carried in the bearing 5 of the machine frame 6 and is driven in conventional manner, for example by means of an electric motor. Provision for a small amount of longitudinal play(s), is provided in the bearing. A guide disc or flange 7 is rigidly connected to the machine frame 6, having an arcuate guiding surface 8 incorporated therein. The inwardly directed flange 7 has peripheral dogs 9. A second guide flange 11 is slidably carried by the projecting end 10 of the shaft 2. It, likewise, has a gripping or guiding surface 12 and peripheral dogs 13 which latter engage between the dogs 9 of the first guide flange and prevent the second flange rotating with the saw blade 1. The two guide flanges are provided with corresponding radial cut away portions 14 (Fig. 2) only at the point of application between A and B, by means of which the guide surfaces 8 and 12 are also interrupted in order to enable the workpiece 15 to move along. The spring 17 acts on the disc 11 by way of the ball bearing 16, and at its other end is supported on the spring plate 18, which is retained by the nut 19, which itself fits on the screw thread 20 at the end of the shaft 2, 10. It is obvious that a friction bearing material or the like may be used as the material for the guide surfaces 8, 12, and that in addition measures may be taken for the extensive lubrication of these surfaces, so that saw blade does not seize therein.

By tightening up the screw 19 the resilient force of the spring is set so high that the guide surface 12 presses the saw blade 1 towards the guide surface 8 with a pressure which is sufficient to prevent vibration and yielding of the part of the saw blade which is disposed freely in the cut away portion 14. The saw blade can adjust itself due to the allowance for longitudinal play(s), according to the gripping force between the surfaces 12 and 8, and seizing is prevented.

In the example of construction illustrated the guide flanges 7 and 11 wholly surround the saw blade with the exception of the operating point and at the same time constitute a protection device.

It may suffice, for guiding of the saw blade over the operating surface, if the arrangement is only tensioned at one point between the guide surfaces 8 and 12, for instance only immediately in front of the operating point (at A) or immediately behind the operating point (at B).

I claim:

1. A mounting arrangement for a rotatable circular saw blade including non-rotatable resiliently-urged means gripping the greater portion of the side faces of said blade for positively guiding said blade at least in the immediate vicinity of its point of application to the material to be cut with sufficient force to prevent deflection of the blade in its unsupported region at said point of application.

2. A mounting arrangement on a sawing machine for supporting a rotatable circular saw blade including a frame comprising in combination a shaft adapted to receive said blade, a non-rotatable first guiding member rigidly secured to the frame of said machine, a non-rotatable second guiding member cooperating with said first guiding member, both said guiding members gripping the greater portion of the side faces of said blade therebetween at least in the immediate vicinity of the point of application of said blade to the material to be cut, and an adjustable spring so disposed as to urge said second guiding member towards said first guiding member, that is into the guiding position.

3. A mounting arrangement as set forth in claim 2 in which said shaft is journalled with an allowance for axial play.

4. A mounting arrangement as set forth in claim 2 in which said members are adapted to enclose the cutting edge of said saw except in the region of said point of application to serve as a protective device.

5. A mounting arrangement on a sawing machine for supporting a circular saw blade comprising in combination a shaft on which said blade may be secured, a first flange member rigidly fixed to the frame of said machine and adjacent one side face of said blade, a second and complementary flange member adjacent the other side face of said blade, said members having arcuate raised portions over the full extent of their adjacent faces for guiding and gripping the greater portion of the side faces of said blade near its periphery and for abutting almost around and beyond said periphery to guard the blade cutting edge, and being cut away radially in the immediate region of the point of application of the saw to the material to be worked, a spring disposed so as to urge said second flange member towards said first flange member and adjustment means for said spring.

6. A mounting arrangement for a rotatable circular saw blade including non-rotatable resiliently-urged means gripping substantially a ring-like area adjacent the outer periphery of the said blade with the exception of a cut out portion at the point of application of the said blade to the material to be cut, providing an unsupported region, for positively guiding the said blade at least in the immediate vicinity of the said point of application of the said blade to the material to be cut with sufficient force to prevent deflection of the blade in the said unsupported region at said point of application.

7. A mounting arrangement on a sawing machine for supporting a rotatable circular saw blade including a frame comprising in combination a shaft adapted to receive the said blade, a non-rotatable first guiding member of friction-bearing unyielding material and rigidly secured to the said frame of the said machine, a non-rotatable second guiding member of friction-bearing unyielding material cooperating with the said first guiding member and each of said members gripping substantially a ring-like area adjacent the outer periphery of the said blade therebetween with the exception of a cut out portion at the point of application of the said blade to the material to be cut, providing an unsupported region, for positively guiding the said blade at least in the immediate vicinity of the point of application of the said blade to the material to be cut, and an adjustable spring urging the said second guiding member towards the said first guiding member into the guiding position, in order to permit the use of particularly thin blades.

References Cited in the file of this patent

UNITED STATES PATENTS

| | | |
|---|---|---|
| 15,304 | Rice | July 8, 1856 |
| 16,643 | Gross | Feb. 17, 1857 |
| 150,723 | Smith | May 12, 1874 |
| 307,678 | Parish | Nov. 4, 1884 |
| 1,239,489 | Jackson | Sept. 11, 1917 |
| 1,388,186 | McCormick | Aug. 23, 1921 |

FOREIGN PATENTS

| | | |
|---|---|---|
| 667,559 | Germany | Nov. 14, 1938 |